Figure 1:
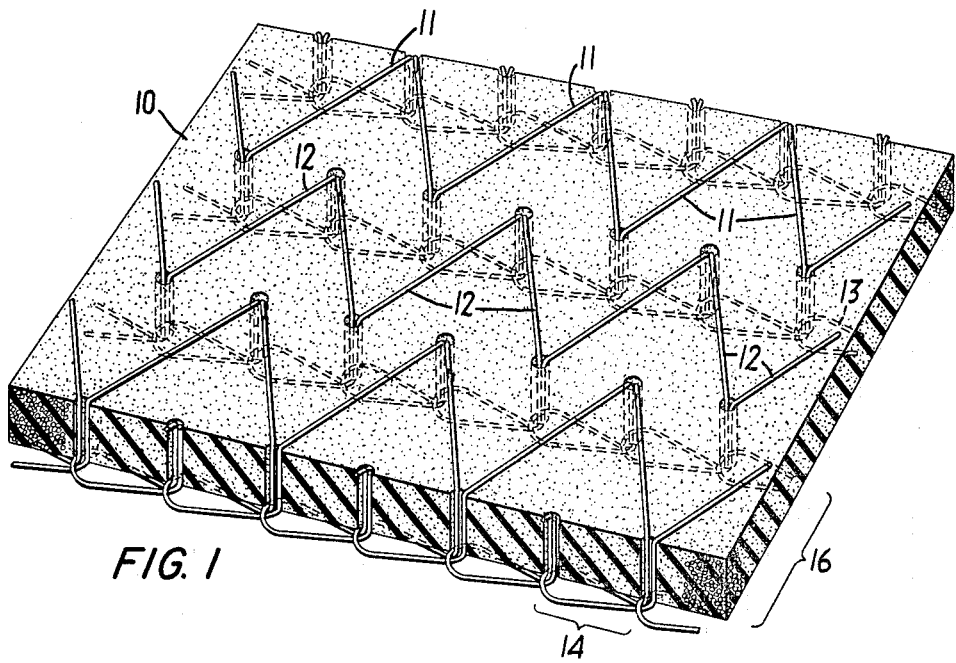

Sept. 27, 1966 D. DUHL 3,274,805
FABRIC AND METHOD
Filed Aug. 9, 1963

INVENTOR.
DANIEL DUHL

BY *(signature)* his ATTORNEYS

3,274,805
FABRIC AND METHOD
Daniel Duhl, New Hyde Park, N.Y., assignor to Indian Head Mills, Inc., New York, N.Y., a corporation of Massachusetts
Filed Aug. 9, 1963, Ser. No. 301,059
5 Claims. (Cl. 66—192)

This invention relates to a novel fabric material comprising an elastomeric foam encased in interlocked yarn and to a method of preparing the material.

Extensive use is being found in the apparel industry for thin sheets of elastomeric foam, made either from rubber or synthetic plastic materials. Foamed polyurethane, for example, finds extensive use in cold weather garments where it is generally combined with layers of conventional fabrics forming inner and outer protective coverings for the sheet of foam.

Considerable interest has also been shown in bonded fabrics, where a layer of a conventional fabric is bonded to a thin sheet of elastomeric foam to form a composite fabric having the limited extensibility and hard exterior surface of the conventional fabric and the insulating properties of the foam layer.

While the bonded laminates of fabric are useful for certain purposes, they have had some limitations. The interposition of an adhesive between the foam and fabric layers creates problems both in processing and in the end use of the fabric. Also, the extensibility of this laminate is limited by the properties of the fabric portion of the laminate.

The elastomeric foams presently available are somewhat fragile and difficult to handle in the thicknesses ordinarily used for clothing purposes. It is recognized that polyurethane foams tear rather easily. Also, whether the foam is bonded to a conventional fabric by adhesive, or loosely joined therewith, as in a quilting operation of a multi-ply structure, the resulting fabric has a hand which is more characteristic of the foam than of the fabric joined with it.

It has now been found that an excellent fabric structure can be prepared by encasing a sheet of flexible elastomeric foam by interlacing within the stitches of an interlocked yarn or fabric such as that known as "tricot." Tricot is a double 1 x 1 warp in which the two warps lap in opposite directions. In forming the fabric of this invention, the chains of loops of yarn are formed on one surface of the elastomeric foam sheet while the yarn passes through the sheet and forms a zig-zag line on the opposite surface of the sheet. The chains of loops and the courses of loop chains are thereby joined with each other.

Tricot constructed clothes are generally made with two guide bars feeding yarn to needles. In making a full tricot stitch, each guide bar feeds yarn to the needles. The back bar first forms a closed tricot stitch using two needles. The front bar at the same time forms a closed tricot stitch across three needles. The two bars working simultaneously form what is known as a full tricot stitch. This structure is shown in FIG. 7 of the drawings.

Figure 2:
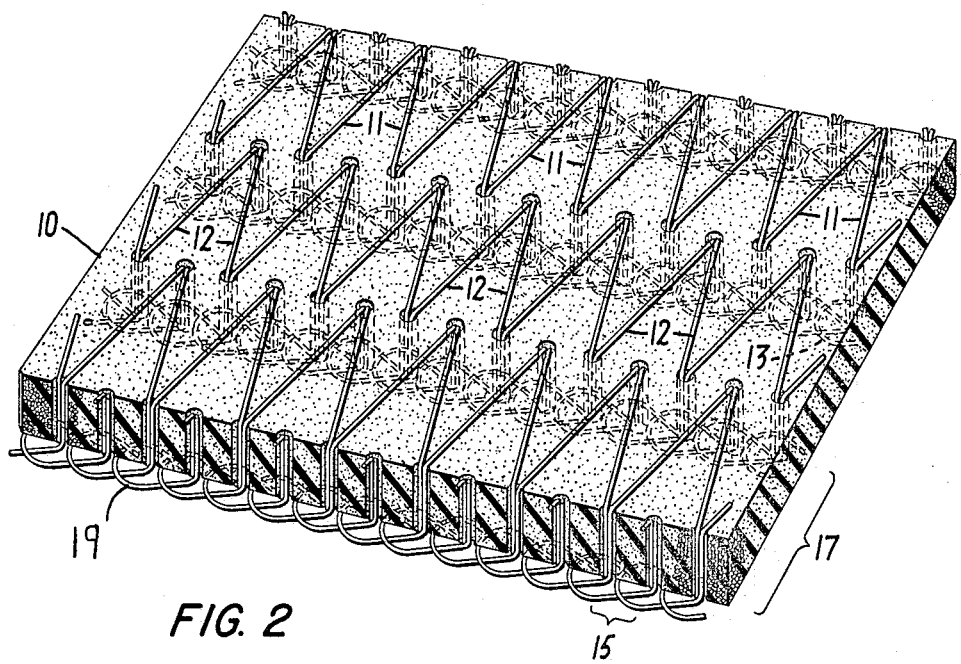

In forming a half tricot stitch as shown in FIGS. 1 and 2 of the drawings, only one guide bar is used and this guide bar forms a closed tricot stitch using two needles. This arrangement is considered to be equivalent to the back bar of the apparatus used in forming a full tricot stitch and the stitch obtained using only one guide bar is therefore called a half tricot stitch. It should be noted that the half tricot stitch is a closed stich. Both the tricot and the half tricot stitches form warp knitted fabrics.

The fabric construction thus provided gives the ability to make use of the extensibility of the elastomeric foam web but limits the extensibility at a point prior to rupture of the elastomeric sheet. At the same time, the yarn provides a protective layer of fabric on both sides of the sheet. The sheet of foam is integrated with the knitted yarn to produce a single ply coherent product having essentially the hand or drape of a knitted fabric and retaining the insulating properties of the foam. As an additional advantage, where thermoplastic yarns such as nylon, are used with sheets of foam such as polyurethane, the resulting fabric structure is moldable under the influence of heat and pressure to form a molded foam product. Molding of the foam sheet itself cannot be accomplished.

The flexible elastomeric foam which may be used according to this invention includes those foams customarily made for use with fabrics and as insulation for various articles of apparel. Sheets of foam rubber and foamed synthetic materials such as polyurethane may be employed. The sheets may be used in thicknesses varying from about 1/32nd of an inch to 1/2 inch, or more, depending upon the end use to which the fabric is to be put. One preferred thickness according to this invention is 5/64ths of an inch.

The sheets of elastomer are available in varying widths. A conventional width is 68 inches, and other widths range from 45 to 78 inches.

The yarn used in the fabric structure of this invention may be nylon, rayon, cotton, wool, linen, Dacron, and the like. It may be monofilament or multifilament, and may range in denier from 15 to 1,000, or more. The preferred yarn is a nylon yarn of about 100 denier.

The number of wales of chains of loops applied to the elastomer sheet varies with the gauge of the machine used to prepare the material. From 7 to 36 wales per inch may be used. The preferred range is from 14 to 22 wales per inch, and the most preferred is 14 per inch.

An important variable in accordance with this invention is the stitch length. It has been found that a stitch length of about 1.5 millimeters provides the most suitable product. A stitch length greater than about 1.5 millimeters allows fabric to be stretched beyond tear limit in the foam and is thus unsatisfactory. A stitch length smaller than 1.5 millimeters is difficult to achieve in practice and the smaller stitch lowers the production rate. The optimum length of 1.5 millimeters has been determined with respect to a polyurethane foam having a thickness of 5/64ths of an inch and with 100 denier nylon and 15/1 cotton yarns.

The yarn may be applied to the foam when the foam is either in the substantially relaxed condition or in a stretched condition, and the product obtained by each process has its own peculiar advantages. The economic value of the product will vary with the thickness of the foam and with the denier of the yarn, and also with the degree of stretch imparted to the foam sheet during the preparation of the fabric. Where stretch is imparted to the foam sheet during the application of the yarn, more yarn is used per relaxed yard of final product, and it can be made only at a slower rate, making it a more expensive product. Also, this product is more extensible than is the product made when the foam is in the relaxed state.

Referring to the accompanying diagrammatic drawings illustrating two preferred embodiments of the invention: FIG. 1 shows an enlarged perspective partly in section of the fabric of the invention, and FIG. 2 shows another embodiment of the invention as in FIG. 1 except that the foam was stretched in one direction during the fabrication thereof.

The invention will be defined in terms of the preferred embodiment wherein the sheet of flexible elastomeric foam is a polyurethane foam having a thickness of $5/64$ths of an inch and wherein the yarn used is 100 denier nylon. The fabric structure is prepared in an appartus such as that described in United States Patent No. 3,030,786 to H. Mauersberger. The particular machine used is 14 gauge, which means that 14 wales of loops per inch is applied to the foam. A stitch length of 1.5 millimeters is employed.

Referring to the drawings, a sheet of polyurethane foam 10 is provided with a covering of yarn on both surfaces by encasing it within the stitches of a tricot fabric using an apparatus as described in the Mauersberger patent identified above. Yarns 11 and 12 are passed through sheet 10 to alternately form loops in chain 13. In FIG. 1, the distance 14 between stitches is approximately 1.5 millimeters, due to the fact that the foam sheet is stitched in a substantially relaxed state. In the normal operation of the machine, from 5 to 10% stretching of the sheet unavoidably occurs during the feeding step and thus the distance 14 will be slightly less than the stitch length of 1.5 millimeters.

FIG. 2 represents the embodiment of this invention wherein the stitches are formed through the foam while the foam is in a stretched condition. In the embodiment illustrated, the foam is stretched approximately 40% during the stitching operation, so that the distance 15 between stitches is approximately half that of distance 14 in FIG. 1 once the completed fabric is relaxed, as shown in FIG. 2. Distances 16 and 17 in FIGS. 1 and 2 refer to the distance between wales of loop chains and is governed by the gauge of the machine.

It will be noted that the loops 19 in FIG. 2 are moved up onto each other as compared with the loops 18 of FIG. 1. This feature accounts for the increased extensibility of the embodiment of FIG. 2.

In order to demonstrate the advantages of the embodiments of FIGS. 1 and 2 over the unstitched foam, a number of tests were conducted, the results of which are given in the following table:

*Bursting strength with 1 inch ball*

| | Lbs. |
|---|---|
| Plain foam | 3.4 |
| Stretch foam fabric—A | 102 |
| Non-stretch foam fabric—B | 54 |

ELASTIC RECOVERY

| | 25% of Burst Penetration | | 50% of Burst Penetration | |
|---|---|---|---|---|
| | Immediate | Delayed | Immediate | Delayed |
| | 1″ Ball | | | |
| Plain Foam | 64 | 96 | 56 | 77 |
| Stretch—A | 49 | 70 | 33 | 53 |
| Non-Stretch—B | 27 | 71 | 23 | 46 |
| | 2″ Ball | | | |
| Plain Foam | 58 | 88 | 54 | 76 |
| Stretch—A | 53 | 78 | 51 | 69 |
| Non-Stretch—B | 55 | 81 | 20 | 57 |

RESILIENCY

| | 25% | 50% |
|---|---|---|
| | 1″ Ball | |
| Plain Foam | 28 | 20 |
| Stretch—A | 31 | 18 |
| Non-Stretch—B | 20 | 19 |
| | 2″ Ball | |
| Plain Foam | 28 | 20 |
| Stretch—A | 27 | 21 |
| Non-Stretch—B | 37 | 26 |

Referring to the table above, Stretch Foam Fabric A was prepared in a 40% stretched condition. Non-stretch Foam Fabric B had 5–10% normal take-up stretch. The foam used in all examples was Scott-foam, a polyurethane foam made by the Scott Paper Company, of $5/64$ inch thickness.

The figures in the Elastic Recovery section of the table refer to the percentage of return observed both immediately and after a suitable period of time, i.e., about 1 hour. The tests are otherwise standard.

I claim:
1. A fabric comprising an elastomeric foam sheet encased in a warp knitted fabric, the fabric comprising yarns which alternately form the loops of adjacent loop chains on one surface of the sheet, pierce the sheet, and form interconnected courses on the other surface of the sheet, the loops of the loop chains being moved up onto each other as a result of the knitting of the fabric through the foam sheet while the sheet is in a stretched condition.
2. A method of preparing a stretch fabric from an elastomeric foam sheet comprising the steps of stretching a sheet of elastomeric foam, knitting a fabric through the stretched sheet, and allowing the sheet to contract in recovery from the stretched condition, the fabric comprising yarns which alternately form the loops of adjacent courses of loop chains on one surface of the sheet, pierce the sheet, and form rows of interconnected loops on the other surface of the sheet.
3. The method of claim 2 wherein the fabric is a tricot stitch comprising threads which alternately form the loops of adjacent courses of loop chains on one surface of the sheet, pierce the sheet, and form courses of thread on the other surface of the sheet.
4. The fabric of claim 1 wherein the knitted fabric is a tricot.
5. A stretch fabric comprising a thin polyurethane foam sheet and a tricot fabric knit through and covering both surfaces thereof, the fabric comprising yarns which alternately form the loops of adjacent loop chains on one surface of the sheet, pierce the sheet, and form interconnected courses on the other surface of the sheet, the loops of the loop chains being moved up onto each other as a result of the knitting of the tricot fabric through the foam sheet while the sheet is in a stretched condition.

References Cited by the Examiner

UNITED STATES PATENTS

| 2,136,368 | 11/1938 | Amidon | 66—84 |
| 2,333,630 | 11/1943 | Amidon | 66—192 X |
| 2,890,579 | 6/1959 | Mauersberger | 66—192 |
| 3,144,671 | 8/1964 | Gould et al. | 139—420 X |

FOREIGN PATENTS 38-2848   4/1963   Japan.

MERVIN STEIN, *Primary Examiner.*

RUSSELL C. MADER, DONALD W. PARKER,
*Examiners.*

P. C. FAW, *Assistant Examiner.*